United States Patent
Forman et al.

(10) Patent No.: US 8,980,088 B2
(45) Date of Patent: Mar. 17, 2015

(54) FLUID TREATMENT ARRANGEMENTS AND METHODS OF MAKING FLUID TREATMENT ARRANGEMENTS

(75) Inventors: Rachel Forman, Astoria, NY (US); Martin J. Weinstein, South Dartmouth, MA (US)

(73) Assignee: Pall Corporation, Port Washington, NY (US)

( * ) Notice: Subject to any disclaimer, the term of this patent is extended or adjusted under 35 U.S.C. 154(b) by 431 days.

(21) Appl. No.: 13/425,042

(22) Filed: Mar. 20, 2012

(65) Prior Publication Data

US 2012/0267302 A1    Oct. 25, 2012

Related U.S. Application Data

(60) Provisional application No. 61/476,874, filed on Apr. 19, 2011.

(51) Int. Cl.
| | | |
|---|---|---|
| *B01D 69/12* | (2006.01) | |
| *B01D 63/00* | (2006.01) | |
| *B01J 19/08* | (2006.01) | |
| *B29C 65/14* | (2006.01) | |
| *B29C 65/02* | (2006.01) | |
| *B01D 65/00* | (2006.01) | |
| *B01D 63/08* | (2006.01) | |

(52) U.S. Cl.
CPC .............. *B01D 65/00* (2013.01); *B01D 63/082* (2013.01); *B01D 2313/105* (2013.01); *B01D 2313/125* (2013.01)
USPC ................. 210/321.72; 210/321.75; 210/488; 210/489; 204/164; 156/281

(58) Field of Classification Search
CPC ........... B01D 63/082; B01D 2313/105; B01D 2313/125; B01D 65/00; B01D 65/003; B01D 63/081; B29C 53/24; B29C 65/02
USPC ........ 210/321.72, 321.75, 488, 489; 204/164; 156/281, 272.6, 304.6, 309.9
See application file for complete search history.

(56) References Cited

U.S. PATENT DOCUMENTS

| | | | |
|---|---|---|---|
| 5,087,514 | A | 2/1992 | Graefe |
| 5,312,507 | A | 5/1994 | Miller |
| 5,868,930 | A | 2/1999 | Kopf |
| 6,009,925 | A | 1/2000 | Hall et al. |
| 2002/0139741 | A1 | 10/2002 | Kopf, III |
| 2005/0126981 | A1 | 6/2005 | Connors, Jr. |

(Continued)

FOREIGN PATENT DOCUMENTS

| | | |
|---|---|---|
| EP | 2 269 715 A1 | 1/2011 |
| EP | 2 283 988 A1 | 2/2011 |
| WO | WO 2006/019616 A1 | 2/2006 |

*Primary Examiner* — John Kim
(74) *Attorney, Agent, or Firm* — Leydig, Voit & Mayer, Ltd.

(57) ABSTRACT

A fluid treatment arrangement may include a fluid treatment unit having a multilayer structure. The multilayer structure may include at least one feed layer, at least one permeate layer, and at least one layer of a permeable fluid treatment medium between the feed layer and the permeate layer. The fluid treatment unit may further include a thermoset which holds the layers together and forms at least a portion of a first end surface of the fluid treatment unit. The fluid treatment arrangement may also include a thermoplastic sheet which overlies the first end surface of the fluid treatment unit. The thermoset directly bonds to the thermoplastic sheet.

15 Claims, 6 Drawing Sheets

(56) References Cited

U.S. PATENT DOCUMENTS

| | | |
|---|---|---|
| 2005/0173330 A1 | 8/2005 | Osenar et al. |
| 2006/0125187 A1 | 6/2006 | Bartlett et al. |
| 2008/0135468 A1 | 6/2008 | Gagnon et al. |
| 2008/0135499 A1 | 6/2008 | Gagnon et al. |
| 2008/0135500 A1 | 6/2008 | Gagnon et al. |
| 2008/0264852 A1 | 10/2008 | Weinstein et al. |
| 2009/0181244 A1 | 7/2009 | Fukugami et al. |
| 2012/0125456 A1 | 5/2012 | Sayer et al. |

FLUID TREATMENT ARRANGEMENTS AND METHODS OF MAKING FLUID TREATMENT ARRANGEMENTS

FIELD OF THE INVENTION

The present invention relates to fluid treatment arrangements and methods of making fluid treatment arrangements that may be used to treat fluids in a wide variety of ways in single- or multi-use applications. The fluid treatment arrangements may include at least one fluid treatment unit which has a multilayer structure. The multilayer structure may include at least one feed layer, at least one permeate layer, and at least one layer of a permeable fluid treatment medium, and the permeable medium may be positioned between the feed layer and the permeate layer. Feed passages within the fluid treatment unit direct process or feed fluid to the feed layer and along the feed side of the permeable medium. Some or all of the feed fluid passes from the feed side to the permeate side of the permeable medium. As the feed fluid passes through the permeable medium, the fluid is treated according to the fluid treatment characteristics of the medium. For example, the permeable medium may be a filter medium or a capture medium arranged to separate one or more substances from the fluid. From the permeate side of the permeable medium, the fluid passes as filtrate or permeate to the permeate layer, which directs the permeate to permeate passages within the fluid treatment unit. The fluid treatment arrangements may further include a thermoset, which for some embodiments may be a mixture of polyurethane and epoxy. The thermoset holds the layers of the fluid treatment unit together.

SUMMARY OF THE INVENTION

In accordance with one aspect of the invention, fluid treatment arrangements may comprise a fluid treatment unit and a thermoplastic sheet. The fluid treatment unit may have a multilayer structure which includes a feed layer, a permeate layer, and a layer of a permeable fluid treatment medium. The permeable medium may be positioned between the feed layer and the permeate layer and may have a feed side fluidly communicating with the feed layer and a permeate side fluidly communicating with the permeate layer. The fluid treatment unit further includes first and second opposite end surfaces and a thermoset. The thermoset holds the layers of the multilayer structure together. The thermoset also forms at least a portion of the first end surface of the fluid treatment unit. The thermoplastic sheet overlies the first end surface of the fluid treatment unit, and the thermoset directly bonds to the thermoplastic sheet on the first end surface of the fluid treatment unit.

In accordance with another aspect of the invention, fluid treatment arrangements may comprise first and second end pieces, a fluid treatment unit, and a thermoplastic sheet. The first end piece may have a first surface comprising a thermoplastic. The fluid treatment unit may be positioned between the first and second end pieces and may have a multilayer structure which includes a feed layer, a permeate layer, and a layer of a permeable fluid treatment medium. The permeable medium may be positioned between the feed layer and the permeate layer and may have a feed side fluidly communicating with the feed layer and a permeate side fluidly communicating with the permeate layer. The fluid treatment unit may further include first and second opposite end surfaces and a thermoset. The thermoset holds the layers of the multilayer structure together. The thermoset also forms at least a portion of the first end surface of the fluid treatment unit. The thermoplastic sheet may have first and second opposite surfaces and may overly the first end surface of the fluid treatment unit. The thermoset directly bonds to the first surface of the thermoplastic sheet on the first end surface of the fluid treatment unit. The second surface of the thermoplastic sheet may be bonded to the first thermoplastic surface of the first end piece.

In accordance with another aspect of the invention, a fluid treatment arrangement may comprise first and second end pieces, first and second fluid treatment units positioned between the end pieces, and first and second thermoplastic sheets. Each fluid treatment unit may have a multilayer structure which includes a feed layer, a permeate layer, and a layer of a permeable fluid treatment medium. The permeable medium may be positioned between the feed layer and the permeate layer and may have a feed side fluidly communicating with the feed layer and a permeate side fluidly communicating with the permeate layer. Each fluid treatment unit may further include first and second end surfaces and a thermoset. The thermoset holds the layers of the multilayer structure together. The thermoset also forms at least a portion of the first end surface of the fluid treatment unit. The first and second thermoplastic sheets may be positioned between the first end surfaces of the first and second fluid treatment units. Each thermoplastic sheet may have first and second opposite surfaces. The thermoset on the first end surface of the first fluid treatment unit directly bonds to the first surface of the first thermoplastic sheet. The thermoset on the first end surface of the second fluid treatment unit directly bonds to the first surface of the second thermoplastic sheet. The second surfaces of the first and second thermoplastic sheets are bonded to one another.

In accordance with another aspect of the invention, methods of making fluid treatment arrangements may comprise modifying at least a first surface of a thermoplastic sheet to enhance the bond between a thermoset and the first surface of the thermoplastic sheet. The methods may further comprise forming a fluid treatment unit which has a multilayer structure including a feed layer, a permeate layer, and a layer of a permeable fluid treatment medium. Forming the fluid treatment unit may include positioning the permeable medium between the feed layer and the permeate layer with a feed side of the permeable medium fluidly communicating with the feed layer and a permeate side of the fluid treatment medium fluidly communicating with the permeate layer. Forming the fluid treatment unit may further include applying a thermoset to one or more of the feed layer, the permeable medium layer, and the permeate layer. The methods may further comprise directly bonding the thermoset to the modified first surface of the thermoplastic sheet on a first end surface of the fluid treatment unit.

Fluid treatment arrangements and methods for making fluid treatment arrangements which embody one or more aspects of the invention have many advantages. For example, by modifying the surface of the thermoplastic sheet to enhance the bond between the thermoset and the thermoplastic sheet, the thermoset tightly and securely bonds directly to the thermoplastic sheet without the use of additional adhesives, solvents or gaskets. This significantly reduces the spectrum of contaminants that can potentially be extracted from the components of the fluid treatment arrangements and deposited in any fluid flowing through the fluid treatment arrangements. By reducing this spectrum of "extractibles," fluid treatment arrangements embodying the invention provide a far more pure and contaminant-free permeate and/or a retentate with fewer or no added contaminants. Further, for many embodiments, a thermoplastic end piece may be fixed at one or both ends of the fluid treatment unit. By providing a thermoplastic sheet between the thermoplastic end piece and the fluid treatment unit, the thermoplastic end piece may be tightly and securely bonded to the thermoplastic sheet which, in turn, is tightly and securely bonded to the thermoset of the fluid treatment unit. This results in a highly robust structure easily capable of withstanding the forces associated with pressurized fluid within the fluid treatment arrangement. In addition, for many embodiments, the thermoplastic end piece and the thermoplastic sheet may be formed from corresponding thermoplastics, e.g., identical or similar thermoplastics, and may be heat or melt bonded directly to one another without the use of solvents, adhesives, or gaskets. Again, this significantly reduces the spectrum of extractibles that can potentially be introduced into the fluids flowing through the fluid treatment arrangement and allows for a much more pure and contaminant-free permeate and/or a retentate with fewer or no added contaminants.

DESCRIPTION OF EMBODIMENTS OF THE INVENTION

Figure 1:
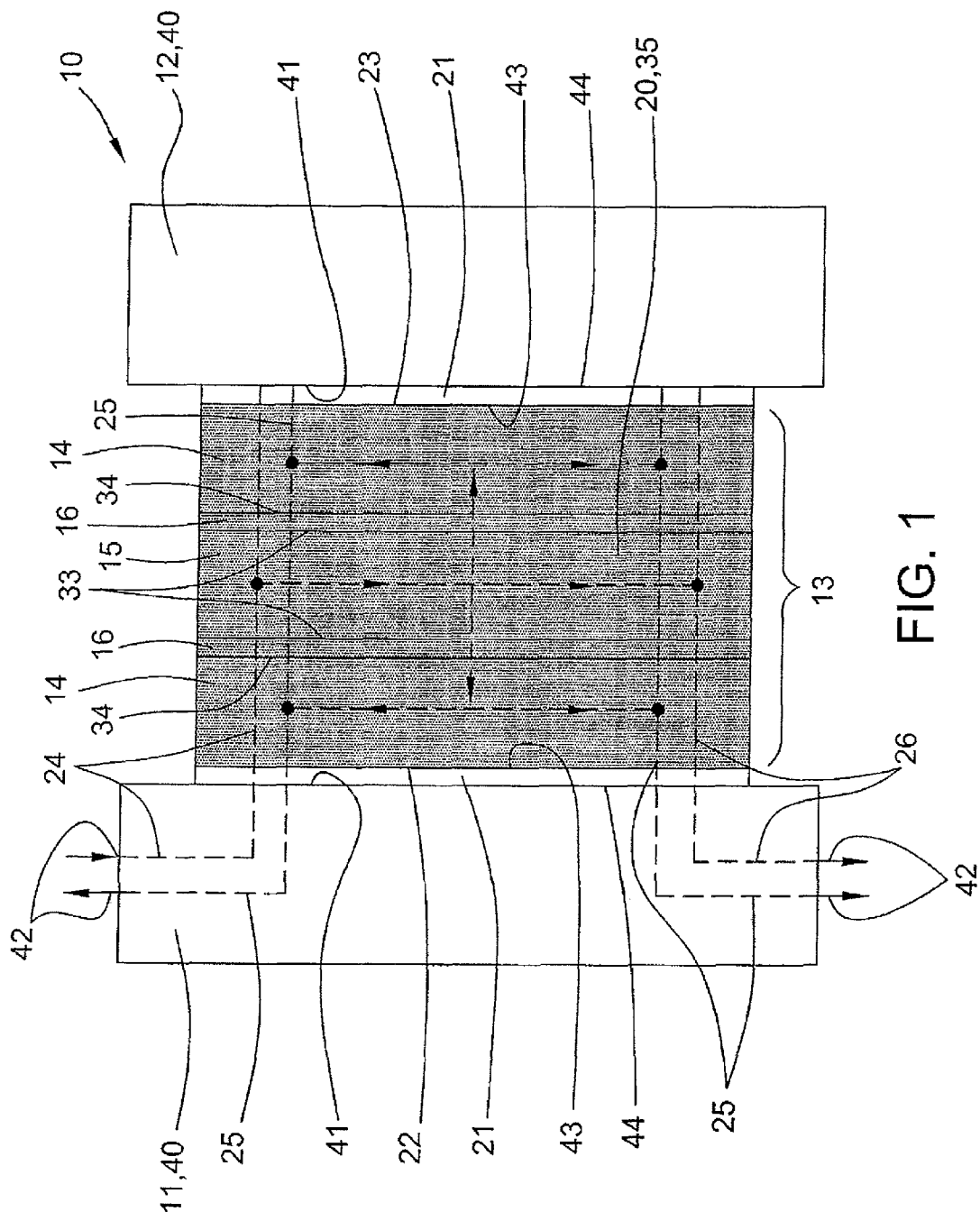
FIG. 1 is a representative view of a fluid treatment arrangement.

Fluid treatment arrangements embodying one or more aspects of the invention may be configured in a wide variety of ways. One of many different examples of a fluid treatment arrangement 10 is shown in FIG. 1. For many embodiments, a fluid treatment arrangement 10 may comprise opposite end pieces 11,12 and one or more fluid treatment units 13 positioned between the end pieces 11,12. A fluid treatment unit may comprise a multilayer layer structure including at least one feed layer, at least one permeate layer, and at least one layer of a permeable fluid treatment medium positioned between the feed layer and the permeate layer. For example, in FIG. 1 the fluid treatment unit 13 may include two permeate layers 14, a feed layer 15 between them, and a layer 16 of a fluid treatment medium between each permeate layer 14 and the feed layer 15. The fluid treatment unit 13 may further include a solidified thermoset 20 which holds the layers of the fluid treatment unit 13 together and encapsulates the fluid treatment unit. The fluid treatment arrangement 10 may further comprise a thermoplastic sheet 21 between the fluid treatment unit 13 and an end piece 11,12. On one or both end surfaces 22,23 of the fluid treatment unit 13, the thermoset 20 bonds directly to a thermoplastic sheet 21 which, in turn, may be bonded, e.g., melt bonded, to the adjacent end piece 11,12.

The fluid treatment arrangement, including one or both end pieces, the fluid treatment unit, and the thermoplastic sheet, may include various fluid passages, e.g., feed passages, permeate passages, and/or retentate passages, for directing fluid through the fluid treatment arrangement. For example, one or both of the end pieces may be a manifold which has at least one fluid passage for directing fluid to, or receiving fluid from, the fluid treatment unit(s). Similarly, fluid passages within the fluid treatment unit(s) may fluidly communicate with, and extend to, the fluid passage(s) in the manifold via one or more openings in the thermoplastic sheet. The passages may be arranged in a variety of ways to direct fluid serially, in parallel, or in a combined serial/parallel manner through the fluid treatment arrangement. Further, the fluid passages of the fluid treatment arrangement may be arranged for tangential flow or for dead-end flow.

For example, the fluid treatment arrangement 10 shown in FIG. 1 may be arranged for tangential or cross flow. Only one of the end pieces 11 may be a manifold, and it may include one or more feed passages 24, permeate passages 25, and retentate passages 26; the other end piece 12 may be a blind end plate which blocks off the fluid passages. Alternatively, both end pieces may be manifolds. The fluid treatment unit 13 may also have one or more feed passages 24, permeate passages 25, and retentate passages 26 which extend within the fluid treatment unit 13. The feed, permeate, and retentate passages 24,25,26 in the manifold 11 may fluidly communicate with, and extend to, the feed, permeate, and retentate passages 24,25,26 in the fluid treatment unit 13 via feed, permeate, and retentate openings 30,31,32 in the thermoplastic sheet 21, as shown in the fluid treatment arrangement of FIG. 2. Process or feed fluid may be supplied to the manifold 11, which directs the feed fluid via one or more feed passages 24 through the thermoplastic sheet 21 to one or more feed layers 15 of one or more fluid treatment units 13. The feed layer(s) 15 direct the feed fluid tangentially along a feed side 33 of each layer 16 of the fluid treatment medium. A portion of the feed fluid passes through the fluid treatment medium, where the fluid is treated in accordance with the treatment characteristics of the medium. The treated fluid passes as filtrate or permeate into the permeate layer(s) 14, which direct the permeate along the permeate side 34 of each layer 16 of the fluid treatment medium to one or more permeate passages 25. The permeate passages 25, in turn, direct the permeate from the fluid treatment unit(s) 13 through the thermoplastic sheet 21 to the manifold 11, where the permeate is discharged from the fluid treatment arrangement 10. The portion of the feed fluid which does not pass through a fluid treatment medium layer 16 passes as concentrate or retentate into one or more retentate passages 26 that fluidly communicate with the feed passages 24 via the feed layer(s) 15. The retentate passages 26 direct the retentate from the fluid treatment unit(s) 13 through the thermoplastic sheet 21 to the manifold 11, where the retentate is also discharged from the fluid treatment arrangement 10.

Although the illustrated fluid treatment arrangement 10 is arranged for tangential flow, other fluid treatment arrangements embodying the invention may be arranged for dead-end flow and may not have any retentate passages. In dead-end flow, process or feed fluid is supplied to the manifold, which then directs the feed fluid through the thermoplastic sheet to the fluid treatment unit(s), e.g., to the layer(s) of fluid treatment medium via the feed passages and the feed layers. Without the retentate passages, all of the feed fluid passes from the feed layer(s) through the fluid treatment medium as permeate or filtrate to the permeate layer(s). The permeate is then directed via the permeate layer(s) to the permeate passages. The permeate passages, in turn, direct the permeate from the fluid treatment unit(s) through the thermoplastic sheet to a manifold, where the permeate is then discharged from the fluid treatment arrangement.

The components of the fluid treatment arrangement may be configured in many different ways. For example, the fluid treatment units may have any of numerous sizes and shapes. Further, the multilayer structure comprising the fluid treatment unit may have any number of feed layers, permeate layers, and permeable fluid treatment medium layers. For some embodiments, the fluid treatment unit may have a single feed layer, a single permeate layer, and a single fluid treatment medium layer between them. For many embodiments, the fluid treatment unit may include two or more feed layers, e.g., 2 or 3 or 4 or more; two or more permeate layers, e.g., 2 or 3 or 4 or 5 or more, interleaved with the feed layers; and two or more fluid treatment medium layers, e.g., 2 or 4 or 6 or 8 or more. The outermost layers of the fluid treatment unit may both be permeate layers or feed layers. Each fluid treatment medium layer may be positioned between a permeate layer and a feed layer with a feed side of the fluid treatment medium fluidly communicating with the feed layer and a permeate side of the fluid treatment medium fluidly communicating with the permeate layer. For example, in FIG. 1 a layer 16 of fluid treatment medium is positioned between each permeate layer 14 and feed layer 15 with the feed side 33 of the permeable medium fluidly communicating with the feed layer 15 and the permeate side 34 of the medium fluidly communicating with a permeate layer 14. A fluid treatment unit may also have layers other than the feed, permeate, and permeable medium layers.

The feed layer and the permeate layer may serve as spacers to space the permeable media from one another and/or collectors/distributors to collect or distribute fluid along the feed sides and permeate sides of the permeable media. The feed layer and the permeate layer may be dimensioned and shaped in a variety of ways and may be variously configured. For example, one or both layers may comprise a thin, channeled plate capable of directing fluid along one or both opposite sides of the plate. Alternatively, one or both layers 14,15 may comprise a sheet of metallic or polymeric mesh, as shown in the fluid treatment arrangement of FIG. 2. The mesh may, for example, be woven, expanded, or extruded. Further, the mesh may be fine enough to support the fluid treatment medium against the forces associated with fluid flowing through the fluid treatment unit and may be open enough to facilitate fluid flow edgewise through the mesh layer tangentially along the fluid treatment medium. Each layer 14,15,16 may include one or more openings, e.g., feed openings 30, permeate openings 31, and/or retentate openings 32, which allow fluid to flow through the fluid treatment unit 13. The number, type, and location of the openings may vary from one layer to another to accommodate any desired flow pattern through the fluid treatment unit. For some embodiments, all of the feed and permeate layers, as well as the layers of filter media, may have the same number, type, and location of openings, as shown in fluid treatment arrangement of FIG. 2. The feed opening(s), e.g., a single feed opening 30, may be located along one side of the layer 14,15; the retentate opening(s), e.g., a single retentate opening 32, may be located along an opposite side of the layer 14,15; and the permeate opening(s), e.g., two permeate openings 31, may be located one each along the opposite sides spaced and sealed from the feed and retentate openings 30,32. The layers of the multilayer structure may be arranged next to one another with openings in one layer aligned and fluidly communicating with the openings in an adjacent layer, either directly or via a feed layer or permeate layer. The openings in the layers may then comprise portions of the fluid passages within the fluid treatment units. For some embodiments, e.g., embodiments having a single feed layer, a single permeable medium and a single permeate layer, each layer of the fluid treatment unit may not have any openings.

The fluid treatment medium may be permeable, i.e., porous, permeable, semipermeable, or permselective, and may be formed from any of numerous materials, including, for example, a natural or synthetic polymer. The fluid treatment medium may be fashioned as any of a wide variety of structures, including, for example, a fibrous or filamentous structure, such as a woven or non-woven sheet, or a membrane, such as a supported or unsupported membrane. Further, the fluid treatment medium may have, or may be modified to have, any of a myriad of fluid treatment characteristics. For example, the fluid treatment medium may have a positive, negative, or neutral electrical charge; it may be liquiphobic or liquiphilic, including hydrophobic or hydrophilic or oleophobic or oleophilic; and/or it may have attached functional groups, such as ligands or any other reactive moiety, that can chemically bind to substances in the fluid. The fluid treatment medium may be formed from, impregnated with, or otherwise contain a variety of materials that function to further treat the fluid in any of numerous ways. These functional materials may include, for example, sorbents, ion exchange resins, chromatography media, enzymes, reactants, or catalysts of all types that may chemically and/or physically bind, react with, catalyze, deliver, or otherwise affect substances in the fluid or the fluid itself. Further, the fluid treatment medium may have any of a wide range of molecular cutoffs or removal ratings, for example, from ultraporous or nanoporous or finer to microporous or coarser. The fluid treatment medium may thus function as a treatment medium of any type, including a capture medium or a separation medium such as a filtration medium.

The thermoset may comprise any of numerous thermosetting materials, including for example, a urethane, an epoxy resin (including diglycidyl ether of bisphenol A (DGEBA), novolac resins, cycloaliphatic epoxy resins, brominated resins, epoxidized olefins, EponR and EpikoteR), a polyimide (including aliphatic and aromatic polyimides), an unsaturated polyester (including orthophthalic ("ortho"), isophthalic ("iso"), dicyclopentadiene ("DCPD") and bisphenol A fumarate resins), a vinyl ester (including a combination of an epoxy resin with acrylic or methacrylic acid), a urea-formaldehyde, or a silicone, or a combination, e.g., a copolymer, a mixture, or a reaction, of two or more of these materials, including, for example, a two part epoxy reaction where one part has a urethane linkage in a polymer.

Figure 2:
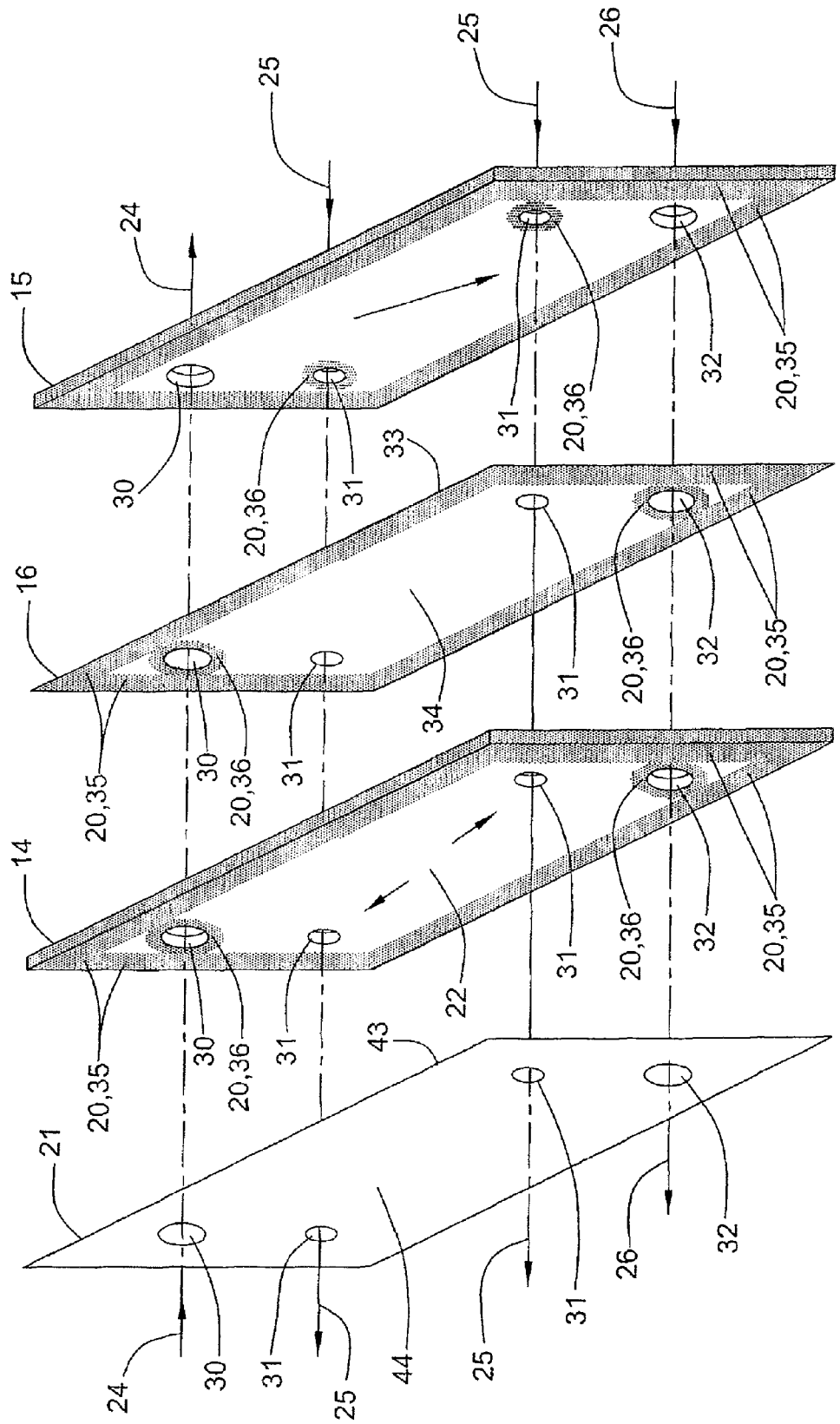
FIG. 2 is an exploded view of a portion of the fluid treatment arrangement of FIG. 1.

As shown in FIGS. 1 and 2, the solidified thermoset 20 may extend around the outer peripheral regions 35 of the layers 14,15,16 of the fluid treatment unit 13, bridging the layers 14,15,16 and holding the layers 14,15,16 tightly together as well as encapsulating the fluid treatment unit 13. The thermoset 20 may contact the edges of the layers 14,15,16 and the surfaces of the layers 14,15,16 near the outer peripheries. The thermoset 20 may also extend outward beyond the peripheries of one or more of the layers 14,15,16. For example, the dimensions of one or more of layers, e.g., the outermost layers, may be slightly greater than the dimensions of one or more of the other layers, e.g., some of the inner layers including the fluid treatment medium layers, causing the larger layers to extend slightly beyond the smaller layers. The thermoset may than extend beyond the peripheries of the smaller layers to a greater extent than the larger layers. Further, the thermoset may be infiltrated within one or more of the layers 14,15,16, especially any mesh layers, in the peripheral regions 35, filling the pores or interstices within these peripheral regions of the layers with the thermoset 20.

The thermoset 20 may also extend around the edge regions 36 of one or more of the openings 30,31,32 in the layers 14,15,16, including the permeate layer 14 and the feed layer 15. The thermoset 20 then seals the opening 30,31,32 from the remainder of the layer 14,15,16 and prevents fluid from flowing between the opening 30,31,32 and the remainder of the layer 14,15,16. The thermoset 20 may extend outward from the edge of the opening 30,31,32 and may contact the surface of the layer 14,15,16 and/or infiltrate the layer 14,15, 16 in the edge region 36 of the opening 30,31,32. For many embodiments, the thermoset 20 may extend around the edge of one or more openings 30,31,32 in the outermost layers of the fluid treatment unit 13, e.g., the permeate layers 14 shown in FIG. 1. However, a different sealant, for example, a softer sealant such as a silicone, may extend around and seal the edge regions of one or more openings, especially in the inner layers. The softer sealant may even more effectively press and seal against the permeable medium layer 16.

At least a portion of the first end surface 22 or both the first and second end surfaces 22,23 of the fluid treatment unit 12 may comprise the thermoset 20. For example, the thermoset 20 may extend along the peripheral region 35 of the outermost layer, e.g., the outermost permeate layer 14 or the outermost feed layer, on the end surfaces 22,23 of the fluid treatment unit 13. The thermoset 20 may also extend along the edge region 36 of one or more openings 30,31,32 in the outermost layer on the end surfaces 22,23 of the fluid treatment unit 13. The thermoset 20 in at least these regions of the first and second surfaces 22,23 may bond directly to the thermoplastic sheet 21 overlying the end surfaces 22,23. The remaining portion of the end surfaces 22,23 may comprise the outermost layer. The thermoplastic sheet 21 overlying the end surface 22,23 may directly contact the outermost layer in the remaining portion of the end surface 22,23. However, because there is no thermoset in the outermost layer in the remaining portion of the end surface 22,23, the thermoplastic sheet 21 may not be bonded to the outermost layer in the remaining portion of the end surface 22,23.

Figure 3:
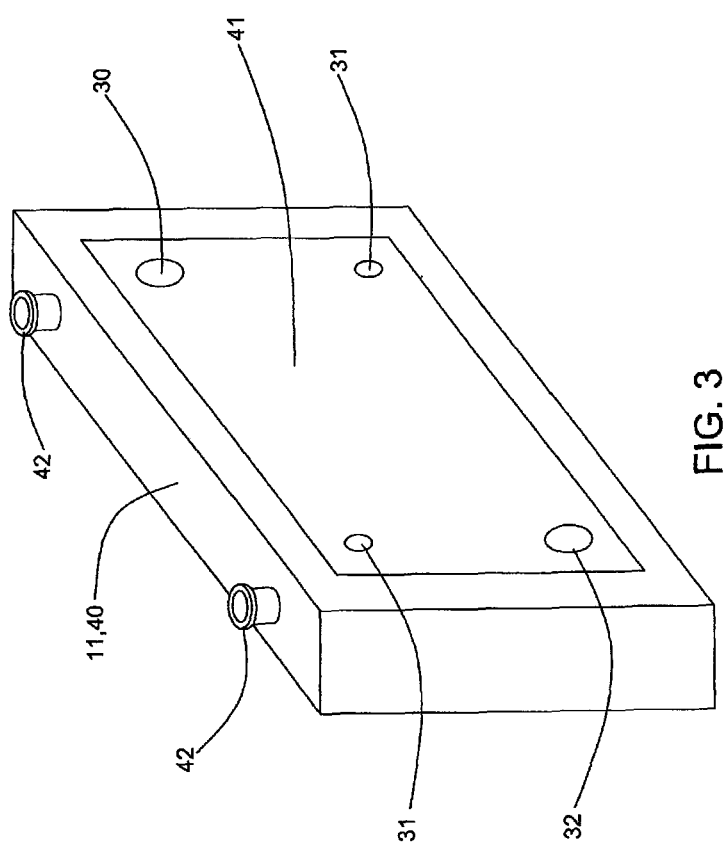
FIG. 3 is an oblique view of an end piece.

The end pieces may be configured in many different ways. For example, as shown in FIGS. 1 and 3, each end piece 11,12 may comprise a body 40 which has a rectangular box-like configuration and which has a mounting surface 41 facing an end surface 22,23 of the fluid treatment unit 13. One or both of the end pieces may comprise a manifold which includes one or more fluid passages and/or a blind end plate which has no fluid passages. In FIG. 1 one end piece comprises a blind end plate 12 while the other end piece comprises a manifold 11 that may include feed, permeate, and/or retentate passages 24,25,26. The fluid passages may be variously configured. For example, each fluid passage may include one or more passageways or channels which may be straight, curved, branched, and/or tortuous. As shown in FIG. 3, each fluid passage 24,25,26 may extend within the body 40, for example, from a port 42, e.g., a fitting, on one side of the body 40 to an opening, e.g., a feed, permeate, or retentate opening 30,31,32, in the mounting surface 41. The openings 30,31,32 in the mounting surface 41 may align with and fluidly communicate with the openings 30,31,32 in an end surface 22 of the fluid treatment unit 13. The mounting surface 41 of the blind end plate 12 may be similar to the mounting surface 41 of the manifold 11 without the openings 30,31,32. The mounting surface 41 may be generally flat and may have a shape and dimensions which correspond to the end surface 22,23 of the fluid treatment unit 13. The mounting surface may also include surface features, e.g., ridges around the openings and/or the periphery of the mounting surface. Some examples of manifolds are disclosed, for example, in United States Patent Application Publication No. US 2008/0135500 A1 entitled Filtration Assemblies, Filtration Manifolds, Filtration Units, and Methods for Channeling Permeate and in U.S. patent application Ser. No. 12/954,118 filed on Nov. 24, 2010 and entitled Manifold Plates and Fluid Treatment Arrangements Including Manifold Plates.

The end pieces, including at least the mounting surface, may include a thermoplastic. For example, the entire end piece and/or the mounting surface may be formed from a thermoplastic. For example, the thermoplastic may be a polyolefin, including a polypropylene, a polyethylene, and a polybutylene. The thermoplastic may also be a polycarbonate, a polysulfone, a polystyrene, a polyvinylchloride, a polyetheretherketone, a polyethylene terepthalate (Dacron®), a polyamide (Nylon®), a polytetrafluoroethylene (Teflon®), a polyacrylic, such as polymethyl methacrylate, and an acrylanitrile butadiene styrene, or a mixture of two or more of these materials, including, for example, a mixture or copolymer of polyethylene and polypropylene or polystyrene and acrylonitrile, or styrene and butadiene, for example. The thermoplastic end pieces, including the thermoplastic mounting surface, may be formed in numerous ways, including, for example, by machining, casting, or molding.

The thermoplastic sheet, which may be an extruded sheet, may also be formed from any of numerous thermoplastics, including homopolymers and copolymers. The thermoplastic sheet, along with the thermoset, may bond the fluid treatment unit to the mounting surface of an end piece. Consequently, for many embodiments the thermoplastic sheet may include a thermoplastic which corresponds to the thermoplastic from which the end piece and/or the mounting surface is formed. One thermoplastic may correspond to another thermoplastic if it is identical to, or in the same genus as, the other thermoplastic and securely melt bonds to the other thermoplastic. Forming the thermoplastic sheet and the end piece from corresponding thermoplastics has many advantages. For example, it facilitates a strong secure bond, e.g., a melt bond, between the thermoplastic sheet and the thermoplastic mounting surface of the end piece. In addition, it reduces the spectrum of extractibles that can potentially be introduced into the fluid flowing through the fluid treatment assembly. Further, the thermoplastics to be melt bonded may have similar melt temperatures, e.g., melt or softening temperatures differing by about 40° C. or less.

The thermoplastic sheet, like the end piece, may comprise a polyolefin, including a polypropylene, a polyethylene, and a polybutylene; a polycarbonate; a polysulfone; a polystyrene; a polyvinylchloride; a polyetheretherketone; a polyethylene terepthalate (Dacron®); a polyamide (Nylon®); a polytetrafluoroethylene (Teflon®); a polyacrylic, including polymethyl methacrylate; an acrylanitrile butadiene styrene; or a combination, e.g., a mixture or copolymer, of two or more of these materials, including, for example, a mixture or copolymer of polyethylene and polypropylene, polystyrene and acrylonitrile, or styrene and butadiene, for example. The thermoplastic sheet may also comprise a thermoplastic elastomer, including a styrene block copolymer; a polyolefin blend, such as a polypropylene based elastomer, e.g., Sarlink® 3160; a thermoplastic polyurethane; a thermoplastic copolyester; or a thermoplastic polyamide.

The thermoplastic sheet may be variously configured. For many embodiments, the size and shape of the thermoplastic sheet 21 may be similar to the size and shape of the mounting surface 41 of the end piece 11,12 and/or the end surface 22,23 of the fluid treatment unit 13. The thickness of the thermoplastic sheet may be in the range from about 0.015 inch (0.33 millimeter) or less to about 0.125 inch (3 millimeter) or more, e.g., about 0.040 inch (1 millimeter)±25%. For some embodiments, including some of the thicker embodiments, the thermoplastic sheet may be rigid or semirigid. However, for many embodiments, the thermoplastic sheet may be a flexible sheet. The thermoplastic sheet may have opposite surfaces, may be generally flat, may be generally impermeable, and may include one or more fluid openings that allow fluid communication between the manifold and the fluid treatment unit. The one or more fluid openings in the thermoplastic sheet may be similar in size and location to the fluid openings in the mounting surface of the end piece and/or adjacent outermost the layer of the fluid treatment unit. In FIG. 1 the thermoplastic sheet 21 between the manifold 11 and the fluid treatment unit 13 may have feed, permeate, and retentate openings 30,31,32 that align with and fluidly communicate between the feed, permeate, and retentate openings 30,31,32 of the mounting surface 41 and the outermost layer of the fluid treatment unit 13, extending the feed, permeate, and retentate passages between the manifold 11 and the fluid treatment unit 13. The thermoplastic sheet 21 between the blind end plate 12 and the fluid treatment unit 13 may or may not have any openings.

The fluid treatment arrangement may include one or more additional components. For example, the fluid treatment arrangement may include one or more alignment rods for maintaining the fluid treatment unit(s) and manifold plate(s) properly aligned with their fluid passages and openings fluidly communicating with one another. The fluid treatment arrangements may include one or more compression rods for compressing the fluid treatment unit(s) between the end pieces. Examples of alignment rods and compression rods are disclosed, for example, in United States Patent Application Publication No. 2008/0135468 A1 entitled Filtration Assemblies and Methods of Installing Filtration Units in Filtration Assemblies and in United States Patent Application Publication No. 2008/0135499 A1 entitled Filtration Assemblies and Methods of Maintaining Compression of Filtration Units in Filtration Assemblies. Alternatively or additionally, the fluid treatment arrangements may be compressively held within a mechanical and/or hydraulic holder or press.

Fluid treatment arrangements embodying the invention may be made in many different ways. For example, methods of making fluid treatment arrangements may include modifying one or both surfaces of the thermoplastic sheet. For many embodiments, the surface of the thermoplastic sheet which faces and is to be bonded to the fluid treatment unit may be modified, e.g., physically modified and/or chemically modified, to alter the physical characteristics and/or the chemical characteristics of the surface and enhance the bond between the thermoset and the surface of the thermoplastic sheet. Many different surface characteristics of the thermoplastic sheet may be modified, including, for example, the texture and the surface tension or surface energy. The surface, or both opposite surfaces, of the thermoplastic sheet may be textured, for example, irregularly textured, e.g., by roughening the surface(s), or regularly textured, e.g., by embossing the surface(s) with small ridges and valleys or other surface features, to enlarge the surface area to which the thermoset will bond. The textured, or untextured, surface(s) of the thermoplastic sheet may be modified to alter the surface tension or surface energy of the thermoplastic sheet in a manner which enhances the bond between the thermoset and the thermoplastic sheet. For example, for many thermoplastic sheets, including a polyolefin sheet such as a polypropylene sheet, and for many thermosets, including a urethane-linked thermoset, the surface tension of the thermoplastic sheet may be increased, e.g., up to about 40 dynes/cm or more.

The surface(s) of the thermoplastic sheet may be modified in any of a variety of ways, including, for example, by means of an e-beam or irradiation such as UV irradiation. For many embodiments, modifying the surface(s) of the textured or untextured thermoplastic sheet may include subjecting the thermoplastic sheet to a corona discharge. When the surface(s) of the thermoplastic sheet is subjected to a corona discharge, the electrons generated in the corona discharge may impact on the surface with energies sufficient to break the molecular bonds on the surface. Resulting free radicals may react rapidly with oxidating products of the corona discharge, or with adjoining free radicals on the same or different chain, resulting in a cross-link. Oxidation of the surface of the thermoplastic sheet in this manner may then increase the surface energy and the surface tension, allowing for better wetting by the thermoset and enhancing the bond between the thermoset and the thermoplastic sheet. Use of a corona discharge may, for example, raise the surface tension of the thermoplastic sheet up to about 40 dynes/cm or more. A particular advantage to this method of surface treatment is that no additional chemical additives may be used to enhance the bond. For example, no adhesives or other surface oxidizing chemicals may be used to prepare the surface for bonding, thus minimizing the possible presence of extractibles that can potentially be introduced into the fluid flowing through the fluid treatment arrangement. Another similar process, flame treatment, may also provide a similar rise in surface tension. This process uses an oxygenated flame to create free oxygen. This free oxygen then reacts with the surface of the thermoplastic sheet and raises the surface tension. A known disadvantage with both of these processes is that the effect may not be long lasting and may disappear within days to weeks. For many embodiments, the thermoset may be bonded to the modified surface(s) of the thermoplastic sheet within four days of altering the surface tension.

Methods of making fluid treatment arrangements may further include forming a fluid treatment unit and bonding a thermoset on an end surface of the fluid treatment unit directly to the modified surface of the thermoplastic sheet. Forming the fluid treatment unit may include assembling a multilayer structure including at least one feed layer, at least one permeate layer, and at least one layer of a fluid treatment medium positioned between the feed layer and the permeate layer with a feed side of the permeable medium fluidly communicating with the feed layer and a permeate side of the permeable medium fluidly communicating with the permeate layer. Forming the fluid treatment unit may further include applying a thermoset to one or more of the feed layer, the permeable medium layer, and the permeate layer. Assembling the multilayer structure, applying the thermoset, and bonding the thermoset to the modified surface of the thermoplastic sheet may occur sequentially or contemporaneously.

Forming the fluid treatment unit and bonding the thermoset to the modified surface of the thermoplastic sheet may include applying a liquid thermoset in the edge region of at least one opening in the outermost layer, i.e., an outermost permeate layer or an outermost feed layer, of the fluid treatment unit. For instance, the liquid thermoset may be applied to both sides of the outermost permeate layer 14 in the edge regions 36 around the feed and retentate openings 30,32 in the fluid treatment arrangement shown in FIG. 2. The liquid thermoset may infiltrate the outermost permeate layer 14 and form at least a portion of an end surface 22 of the fluid treatment unit 13 in the edge regions 36 around the openings 30,32. The thermoplastic sheet 21 with the modified surface, the outermost permeate layer 14 with the liquid thermoset, and a layer 16 of fluid treatment medium may then be pressed together with their openings 30,31,32 aligned and with the modified surface 43 of the thermoplastic sheet 21 pressed against the liquid thermoset and the remainder of the end surface 22 of fluid treatment unit 13. The thermoset 20 may then set and solidify, bonding directly to the modified surface 43 of the thermoplastic sheet 21 in the edge regions 36 around the openings 30,31. A second thermoplastic sheet may similarly be modified and then bonded to the outermost layer, e.g., an outermost permeate layer or an outermost feed layer, on the opposite end surface of the fluid treatment unit. The thermoset may bond directly to the modified surface of the second thermoplastic sheet in the edge regions around the openings in the second thermoplastic sheet on the second end surface of the fluid treatment unit.

Forming the fluid treatment unit and bonding the thermoset to the manifold surface of the thermoplastic sheet may include applying a liquid thermoset around the periphery of the fluid treatment unit, e.g., around the periphery of one or more of the feed layer, the permeable medium layer, and the permeate layer. For example, the inner layers of the fluid treatment unit, e.g., the inner feed layers, permeate layers, and/or layers of fluid treatment media, may be positioned and pressed between the outermost layers previously bonded to the thermoplastic sheets with their openings aligned. Prior to positioning the inner layers between the outer layers, a sealant may be applied to the edge regions around the appropriate openings in the inner layers, e.g., the permeate openings in the feed layers and/or the feed and retentate openings in the permeate layers, to create the desired flow passages within the fluid treatment unit and to isolate the feed and retentate passages from the permeate passages. The sealant may be the liquid thermoset or a softer sealant, such as a silicone, to prevent any damage to the more delicate fluid treatment media. For instance, as shown in the fluid treatment arrangement of FIG. 2, a silicone sealant may be applied to the edge regions 36 around the permeate openings 34 in the feed layer 15. The feed layer 15 may then be positioned and pressed between the adjacent layers 16 of fluid treatment media and the outermost permeate layers 14 previously bonded to the thermoplastic sheets 21. A liquid thermoset may then be applied around the periphery of the fluid treatment unit, e.g., around the peripheries of the feed layer, the permeate layer, and/or the layers of the fluid treatment media. Alternatively or additionally, the liquid thermoset may be applied to the outer peripheral regions of the feed, permeate, and/or permeable medium layers before they are pressed together. A vacuum may be applied to the openings in the thermoplastic sheets to pull the liquid thermoset onto the peripheral regions of the layers. For example, a vacuum may be applied to the openings 30,31,32 in the thermoplastic sheets 21, pulling the liquid thermoset onto the peripheral regions 35 of all of the layers 14,15,16, where the liquid thermoset may infiltrate one or more of the mesh layers 14,15 and/or the fluid treatment media. Alternatively or additionally, excess liquid thermoset may be applied to extend outwardly beyond the peripheries of one or more of the layers 14,15,16.

The thermoset 20 may then set and solidify, bonding directly to the modified surface 43 of the thermoplastic sheet 21 around the periphery of the outermost layers 14, holding the feed, permeable media, and permeate layers 14,15,16 together, and encapsulating the fluid treatment unit 13. The solidified thermoset around the periphery of the fluid treatment unit seals the interior from the exterior of the fluid treatment unit, while the sealant, including the solidified thermoset and the silicone, around the appropriate openings in the layers seals the feed and/or retentate passages from the permeate passages. Further, the solidified thermoset forms a portion of each end surface of the fluid treatment unit, for example, in the peripheral regions of the outermost layers, e.g., the outermost permeate layers or the outermost feed layers, and/or around the edge regions of one or more openings in the outermost layers. The solidified thermoset directly bonds to the modified surface of each thermoplastic sheet in these regions, tightly securing and sealing each thermoplastic sheet to each end surface of the fluid treatment unit. The remainder of each end surface may be formed by the outermost layer, e.g., the outermost permeate layer or the outermost feed layer, and the thermoplastic sheet may not be bonded directly to the outermost layer.

Methods of making fluid treatment arrangements may further include bonding the opposite surface of one or both thermoplastic sheets, i.e., the surface facing away from the fluid treatment unit, to the thermoplastic mounting surface of one or both end pieces. The thermoplastic surfaces may be bonded in any of numerous ways. For example, the thermoplastic surfaces may be solvent bonded or adhesively bonded. For many embodiments, the thermoplastic surfaces may be heat bonded directly to one another. For example, the opposite surface 44 of the thermoplastic sheet 21 and the thermoplastic mounting surface 41 of an end piece 11,12 may be exposed to a heated platen to soften the surfaces 41,44. Alternatively, other heat bonding techniques, including non-contact heat welding, ultrasonics, or vibration welding, may be used. The entire mounting surface 41 of the end piece 11,12 and the entire opposite surface 44 of the thermoplastic sheet 21 may be heated and softened. However, for many embodiments, only the areas around the openings 30,31,32, or the areas around the openings 30,31,32 and the periphery may be heated and softened. The softened surfaces 41,44 may then be pressed directly together with one or more fluid openings 30,31,32 in the thermoplastic mounting surface 41 aligned with the corresponding openings 30,31,32 in the thermoplastic sheet 21, tightly securing and sealing the end piece 11,12 to the thermoplastic sheet 21 and, in turn, to the fluid treatment unit 13.

There are many advantages associated with embodiments of the invention. For example, by modifying the surface(s) of the thermoplastic sheet to enhance the bond between the thermoset and the thermoplastic sheet, the thermoset tightly and securely bonds directly to the thermoplastic sheet without the use of additional solvents, adhesives, or gaskets. This significantly reduces the spectrum of extractibles that can potentially contaminate fluid flowing through the fluid treatment arrangement, providing a far more pure and contaminant free permeate and/or a retentate with fewer or no additional contaminants. Further, for many embodiments, a thermoplastic end piece may be fixed at one or both ends of the fluid treatment unit. By providing a thermoplastic sheet between the thermoplastic end piece and the fluid treatment unit, the thermoplastic end piece may be tightly and securely bonded to the thermoplastic sheet, forming a strong, leak-tight, hermetic seal between the end piece and the thermoplastic sheet, especially around the openings and the periphery. With the thermoplastic sheet, in turn, tightly and securely bonded to the thermoset of the fluid treatment unit, the fluid treatment arrangement is a highly robust structure easily capable of withstanding the forces associated with pressurized fluid within the fluid treatment arrangement. In addition, for many embodiments the thermoplastic end piece and the thermoplastic sheet may comprise corresponding thermoplastics and may be heat or melt bonded directly to one another without the use of solvents, adhesives, or gaskets. Again, this significantly reduces the spectrum of extractibles that can potentially contaminate fluid flowing within the fluid treatment arrangement and provides for a much more pure and contaminant-free permeate and/or a retentate with fewer or no additional contaminants.

While various aspects of the invention have been described and/or illustrated with respect to several embodiments, the invention is not limited to these embodiments. For instance, one or more features of these embodiments may be eliminated or modified or one or more features of one embodiment may be combined with one or more features of other embodiments without departing from the scope of the invention. Even embodiments with very different features may be within the scope of the invention.

For example, a fluid treatment arrangement may have no end piece on one or both ends. For some embodiments, the fluid treatment arrangement may be similar to the fluid treatment arrangement 10 of FIG. 1 without the blind end plate 12 on one end. A thermoplastic sheet, or some other impermeable layer, without any openings may be bonded to the end of the fluid treatment unit opposite the manifold, closing off that end of the fluid treatment arrangement. Alternatively, for some embodiments, the fluid treatment arrangement may be similar to the fluid treatment arrangement 10 of FIG. 5 without the blind end plates 11,12 on both ends. Again, a thermoplastic sheet, or some other impermeable layer, without any openings may be bonded to the end of each fluid treatment unit opposite the manifold, closing off the ends of the fluid treatment arrangement.

As another example, a fluid treatment arrangement may have manifolds on both ends. The fluid treatment arrangement 10 shown in FIG. 4 may have many features in common with the fluid treatment arrangements 10 previously described and shown in the previous figures, and analogous components are identified with the same reference numerals. However, for the fluid treatment arrangement 10 shown in FIG. 4, both end pieces 11,12 may comprise manifolds. One manifold 11 may have one or more feed passages 24 and one or more permeate passages 25, while the other manifold 12 may have one or more retentate passages 26. The fluid treatment unit may have any number of feed, permeate, and permeable medium layers. The fluid treatment unit 13 shown in FIG. 4 may, for example, include three permeate layers 14, i.e., two outermost permeate layers and one intermediate permeate layer; two feed layers 15 interleaved with the permeate layers 14; and four layers 16 of the fluid treatment media, each permeable medium layer 16 being positioned between a permeate layer 14 and a feed layer 15 with the feed side 33 fluidly communicating with the feed layer 15 and the permeate side 34 fluidly communicating with the permeate layer 14. The feed passages 24 within the fluid treatment unit 13 may be arranged to direct feed fluid serially through the two feed layers 15, while the retentate passage 26 within the fluid treatment unit 13 may be arranged to direct retentate to the retentate passage 26 in the manifold 12. The permeate passages 25 within the fluid treatment unit 13 may be arranged to withdraw permeate in parallel from each of the permeate layers 14. The feed, permeate, and retentate openings in each layer 14,15,16 and the thermoplastic sheets 21 may vary from one layer to another to effect the fluid passages shown in FIG. 4. For example, the center permeate layer 14 may have a feed opening on one side but no retentate openings on the other side of the layer 14, while the feed layers 15 may have feed and/or retentate openings on both sides of the layer 15.

Figure 4:
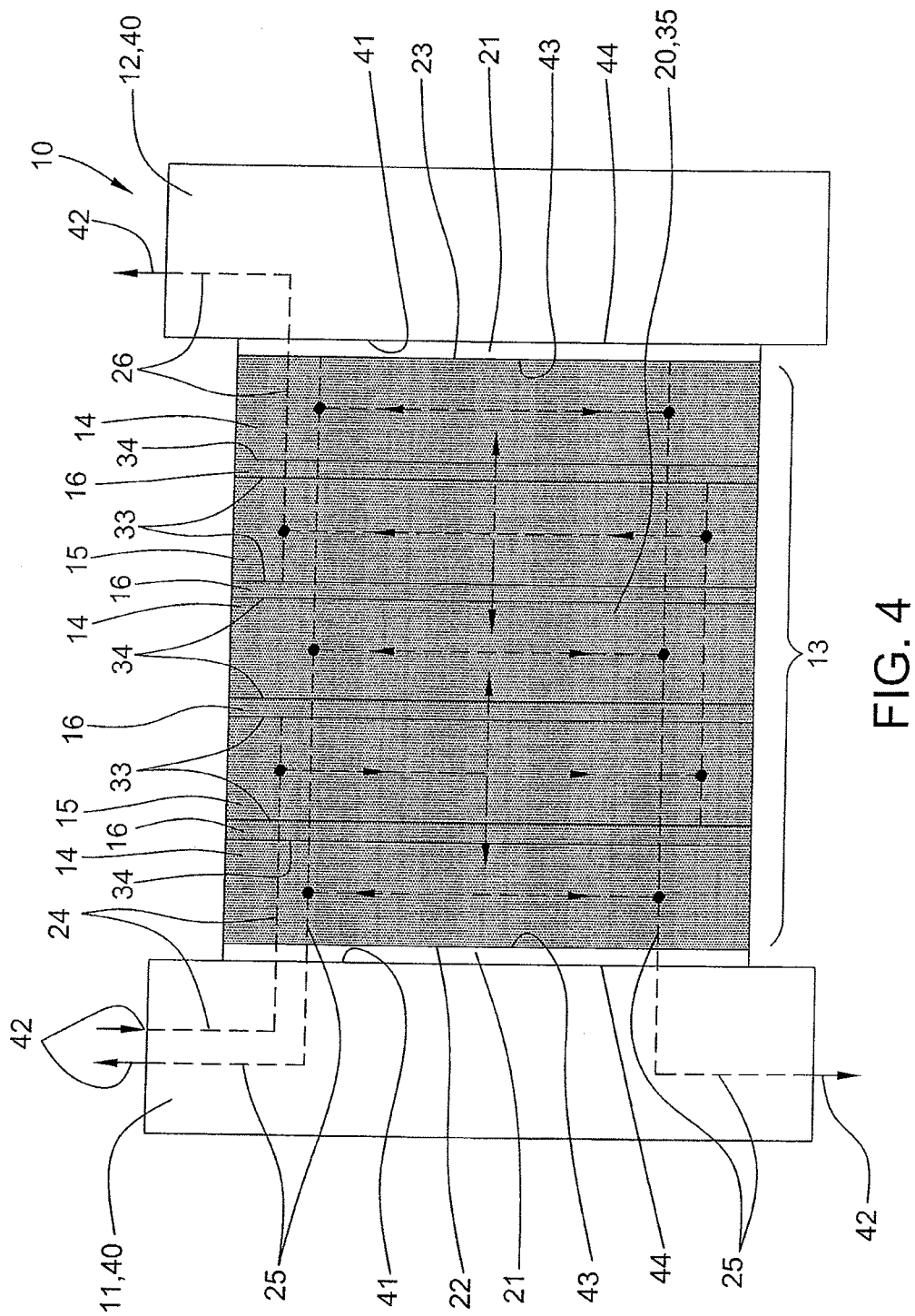
FIG. 4 is a representative view of another fluid treatment arrangement.

The fluid treatment arrangement 10 shown in FIG. 4 may be made in a variety of ways, including by any of the methods previously described. The solidified thermoset 20 may hold the layers 14,15,16 together, encapsulate the fluid treatment unit 13, and form a portion of each end surface 22,23. For example, the thermoset 20 may extend around the peripheral region of each outermost permeate layer 14, around the edge region of the feed opening in one outermost permeate layer 14, and around the edge region of the retentate opening in the other outermost permeate layer 14. One or both surfaces 43,44 of the thermoplastic sheets 21 may be modified as previously described. The thermoset 20 on each end surface 22,23 bonds directly to the modified surface 43 of each thermoplastic sheet 21, tightly securing and sealing the fluid treatment unit 13 to the thermoplastic sheets 21. The opposite surfaces 44 of the thermoplastic sheets 21, in turn, may be bonded, e.g., heat bonded, to the thermoplastic mounting surfaces 41 of the manifolds 11,12, tightly securing and sealing the fluid treatment unit 13 and the thermoplastic sheets 21 between the manifolds 11,12.

As another example, a fluid treatment arrangement may have an intermediate manifold. The fluid treatment arrangement 10 shown in FIG. 5 may have many features in common with the fluid treatment arrangements 10 previously described and shown in the previous figures, and analogous components are again identified with the same reference numerals. However, for the fluid treatment arrangement 10 shown in FIG. 5, both end pieces 11,12 may comprise blind end plates without any fluid passages or fluid openings in the mounting surfaces 41. Further, the fluid treatment arrangement 10 may include a manifold 45 positioned between the end pieces 11,12, for example, with a first set of one or more fluid treatment units 13 on one side of the manifold 45 between the manifold 45 and one end plate 11 and a second set of one or more fluid treatment units 13 on an opposite side of the manifold 45 between the manifold 45 and the other end plate 12. The manifold 45 thus serves as an intermediate end piece between each set of fluid treatment units 13 and a blind end plate 11,12. The manifold 45 may have a body 40 with one or more feed passages 24, one or more permeate passages 25, and one or more retentate passages 26 which fluidly communicate with feed, permeate, and/or retentate openings in a thermoplastic mounting surface 41 on each side of the manifold 45. For some embodiments, the manifold may be positioned between the end plates but adjacent to one of the end plates, while a single set of one or more fluid treatment units may be positioned on only one side of the manifold between the manifold and the other end plate. The manifold may then include a mounting surface with openings on only one side.

Each fluid treatment unit may have any number of feed, permeate, and permeable medium layers. In the fluid treatment arrangement 10 of FIG. 5, each fluid treatment unit 13 may, for example, include two outermost permeate layers 14, one feed layer 15 between the permeate layers 14, and two layers 16 of fluid treatment media, each permeable medium layer 16 being positioned between a permeate layer 14 and a feed layer 15 with the feed side 33 fluidly communicating with the feed layer 15 and the permeate side 34 fluidly communicating with the permeate layer 14. The feed, permeate, and retentate openings in each layer 14,15,16 may be identical or may vary from one layer to another to effect the feed, permeate, and retentate passages 24,25,26 within the fluid treatment unit(s) 13. The feed, retentate, and permeate openings in the two thermoplastic sheets 21 next to the manifold 45 may be identical to those of the adjacent permeate layers 15 and the mounting surfaces 41 of the manifold 45. However, the two thermoplastic sheets 21 next to the end plates 11,12 may or may not have any openings. The manifold 45 may direct the feed fluid in parallel to the fluid treatment units 13 on both sides of the manifold 45 and may collect permeate and retentate in parallel from the fluid treatment units 13 on both sides of the manifold 45.

Figure 5:
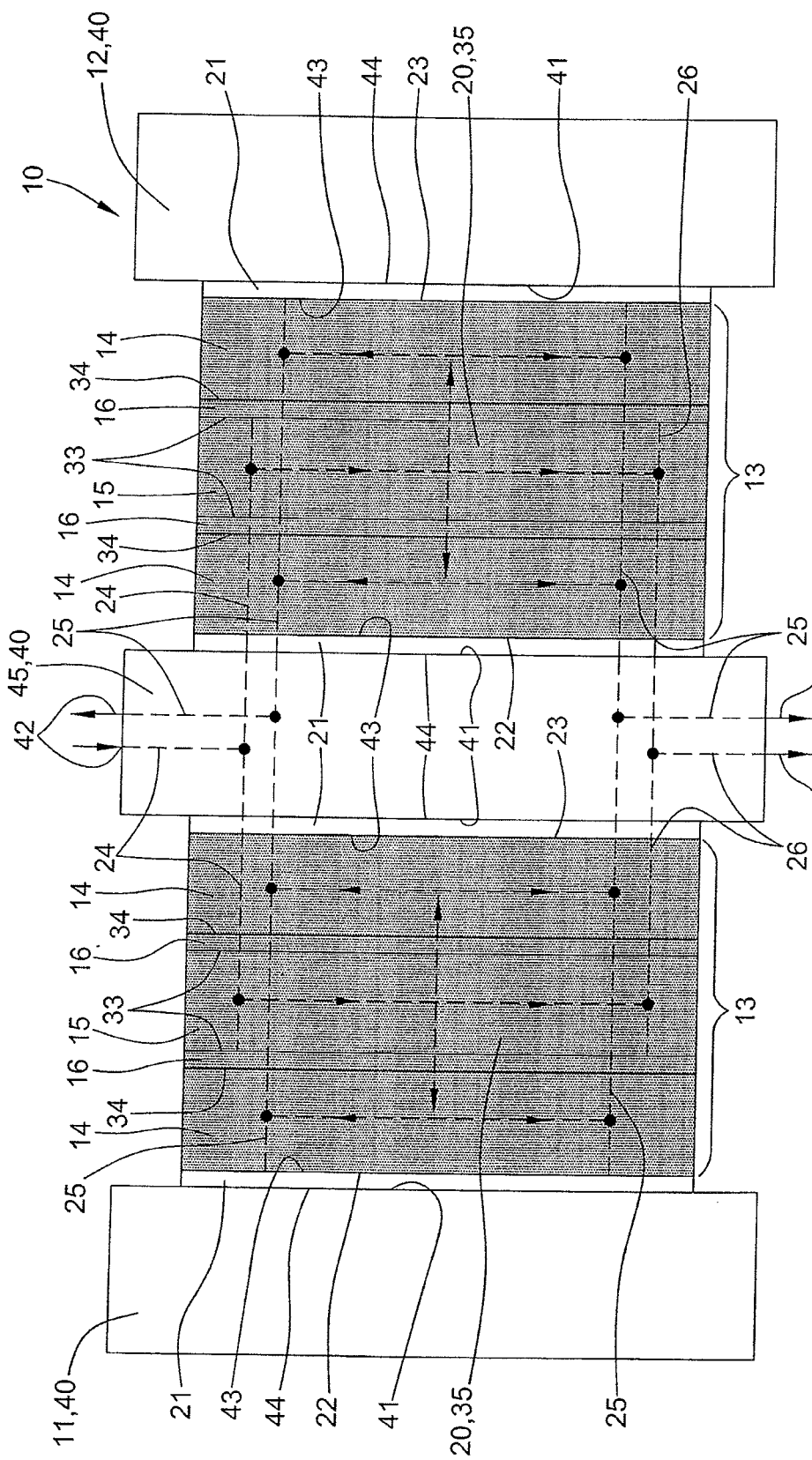
FIG. 5 is a representative view of another fluid treatment arrangement.

The fluid treatment arrangement 10 shown in FIG. 5 may be made in a variety of ways. For example, the fluid treatment arrangement 10 with the intermediate manifold 45 may be made according to the methods previously described with the additional steps of bonding, e.g., heat bonding, the thermoplastic sheets 21 adjacent to the manifold 45 to the thermoplastic mounting surfaces 41 on each side of the manifold 45. The fluid passages 24,25,26 in the manifold 45 may then fluidly communicate with the fluid passages 24,25,26 in the fluid treatment units 13 via feed, permeate, and retentate openings in the thermoplastic sheets 21 bonded to the manifold 45 and the mounting surfaces 41 of the manifold 45. The solidified thermoset 20 may hold the layers 14,15,16 of each fluid treatment unit 13 together, encapsulate the fluid treatment unit 13, and form a portion of each end surface 22,23 as previously described. One or both surfaces 43,44 of the thermoplastic sheets 21 may be modified as previously described. The thermoset 20 on each end surface 22,23 of each fluid treatment unit 13 bonds directly to the modified surface 43 of each intermediate thermoplastic sheet 21 at the ends of each fluid treatment unit 13. The opposite surfaces 44 of the thermoplastic sheets 21, in turn, may be bonded, e.g., heat bonded, to the thermoplastic mounting surfaces 41 on the manifold 45 and the end plates 11,12. The thermoset 20 on the other end surfaces 22,23 of the fluid treatment units 13 bonds directly to the manifold surfaces 43 of the outermost thermoplastic sheets 21, while the opposite surfaces 44 of the outermost thermoplastic sheets 21 may be bonded, e.g., heat bonded, to the mounting surfaces 41 of the end plates 11,12. The thermoplastic sheets 21 are then tightly secured and sealed to both the fluid treatment units 13, the intermediate manifold 45, and the end plates 11,12.

Figure 6:
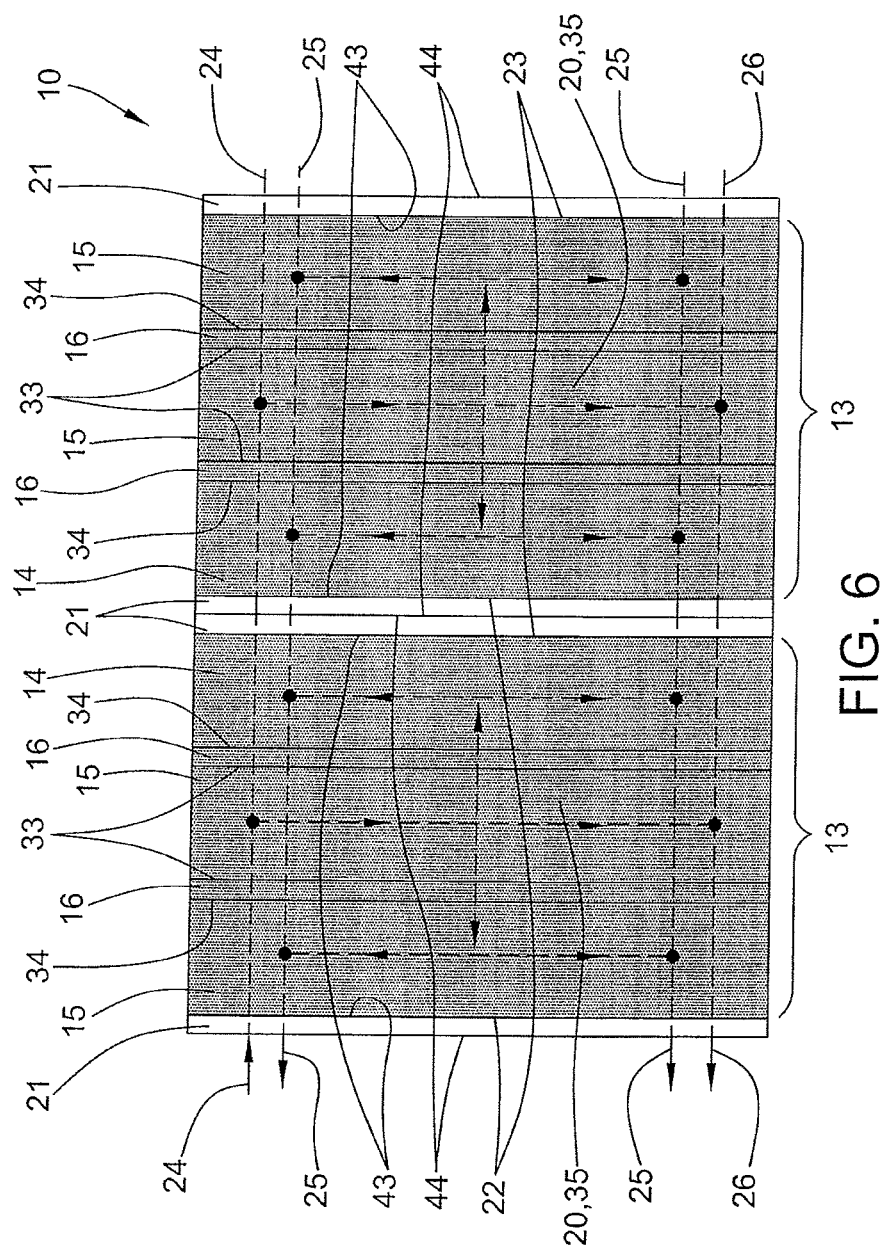
FIG. 6 is a representative view of another fluid treatment arrangement.

As another example, two or more fluid treatment units may be bonded to one another by bonding adjacent thermoplastic sheets. The fluid treatment arrangement 10 shown in FIG. 6 is yet another example and may have many features in common with the fluid treatment arrangements 10 previously described and shown in the previous figures, and analogous components are again identified with the same reference numerals. However, in the fluid treatment arrangement 10 shown in FIG. 6, two or more fluid treatment units 13 may be joined to one another by bonding the adjacent thermoplastic sheets 21 on the two end surfaces 22,23 of the fluid treatment units 13 which face one another. Each thermoplastic sheet 21 on the two end surfaces 22,23 which face away from one another may be bonded to an end piece (not shown) or to another thermoplastic sheet directly bonded to the thermoset of yet another fluid treatment unit (also not shown). Each fluid treatment unit may have any number of feed, permeate, and permeable medium layers. The fluid treatment units may be similar, e.g., identical, to one another or very different from one another. For example, in the illustrated fluid treatment arrangement 10, the two fluid treatment units 13, as well as the thermoplastic sheets 21, may be identical to one another, and each may be identical to the fluid treatment unit 10 and the thermoplastic sheets 21 shown in FIG. 1. Each fluid treatment unit 13 may be made in a variety of ways, including by any of the methods previously described; one or both surfaces 43,44 of the thermoplastic sheets 21 may be modified as previously described; and the thermoset 20 is directly bonded to the modified surface 43 of each thermoplastic sheet 21 on each surface 22,23 of each fluid treatment unit 13, as previously described.

Additionally, the adjacent thermoplastic sheets 21 may be bonded to one another along their opposite surfaces 44 in any of numerous ways. For example, the facing opposite surfaces 44 may be melt bonded to one another, tightly securing and sealing the two fluid treatment units 13 to one another. The thermoplastic sheets, including the bonded thermoplastic sheets, may include feed openings, permeate openings, and/or retentate openings to create any desired flow pattern between the joined fluid treatment units. For example, all of the thermoplastic sheets 21 may have the same feed, permeate, and retentate openings as the feed, permeate, and retentate openings in the feed, permeable medium, and permeate layers 14,15,16 of the two fluid treatment units 13 to extend the feed, permeate, and retentate passages 24,25,26 through both fluid treatment units 13. Alternatively, the thermoplastic sheets, including the bonded thermoplastic sheets, may not include one or more, e.g., all, of the feed, permeate, and retentate openings and, thereby, close off one or more of the feed, permeate, and retentate passages between the fluid treatment units. As previously explained, the entire facing surfaces 44 may be heated and melt bonded to one another or only the areas around the openings and the peripheries may be heated and melt bonded. For thermoplastic sheets with no openings, only the areas around the peripheries may be heated and melt bonded to one another.

The present invention is clearly subject to many variations by those skilled in the art, especially in light of the teachings contained herein. Consequently, the present invention is not restricted to any of the particular embodiments which have been previously described and/or illustrated but, instead, includes all of the embodiments and modifications that may fall within the scope of the invention as defined by the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A method of making a fluid treatment arrangement comprising:

modifying at least a first surface of a thermoplastic sheet to enhance a bond between a thermoset and the first surface of the thermoplastic sheet;

forming a fluid treatment unit having a multilayer structure including a feed layer, a permeate layer, and a layer of permeable medium positioned between the feed layer and the permeate layer with a feed side of the permeable medium fluidly communicating with the feed layer and a permeate side of the permeable medium fluidly communicating with the permeate layer, wherein forming the fluid treatment unit includes applying a thermoset to one or more of the feed layer, the permeable medium layer, and the permeate layer; and directly bonding the thermoset on a first end surface of the fluid treatment unit to the modified first surface of the thermoplastic sheet.

2. The method of claim 1 wherein applying the thermoset includes applying the thermoset around an opening in one of the feed layer and the permeate layer and directly bonding the thermoset around the opening to the modified first surface of the thermoplastic sheet.

3. The method of claim 1 wherein applying the thermoset includes applying the thermoset around the periphery of the feed layer, the permeable medium layer, and the permeate layer and directly bonding the thermoset along the periphery of one of the feed layer and the permeate layer to the modified first surface of the thermoplastic sheet.

4. The method of claim 1 wherein modifying the first surface of the thermoplastic sheet includes modifying a textured first surface of the thermoplastic sheet.

5. The method of claim 1 wherein modifying the first surface of the thermoplastic sheet includes subjecting the first surface to a corona discharge.

6. The method of claim 1 further comprising bonding an opposite second surface of the thermoplastic sheet to a thermoplastic surface of an end piece.

7. The method of claim 6 wherein bonding the second surface of the thermoplastic sheet to the thermoplastic surface of the end piece comprises melt bonding the surfaces.

8. The method of claim 6 wherein bonding the thermoplastic sheet to the thermoplastic surface of the end piece includes bonding corresponding thermoplastics.

9. The method of claim 1 wherein modifying the first surface of the thermoplastic sheet comprises modifying the first surface of a first thermoplastic sheet, the method further comprising modifying at least a first surface of a second thermoplastic sheet to enhance a bond between a thermoset and the first surface of the second thermoplastic sheet and directly bonding the thermoset on an opposite second surface of the fluid treatment unit to the first surface of the second thermoplastic sheet.

10. The method of claim 9 further comprising bonding an opposite second surface of the first thermoplastic sheet to a thermoplastic surface of a first end piece and bonding an opposite second surface of the second thermoplastic sheet to a thermoplastic surface of a second end piece.

11. The method of claim 10 wherein bonding the surfaces of the thermoplastic sheets and the end pieces comprises melt bonding the surfaces.

12. A method of making a fluid treatment arrangement comprising making a first fluid treatment arrangement according to claim 1 and making a second fluid treatment arrangement according to claim 1 and bonding an opposite second surface of the thermoplastic sheet of the first fluid treatment arrangement to an opposite second surface of the thermoplastic sheet of the second fluid treatment arrangement.

13. The method of claim 12 wherein bonding the second surfaces of the thermoplastic sheets includes melt bonding the surfaces.

14. The method of claim 1 wherein modifying the first surface of the thermoplastic sheet includes altering the surface tension of the first surface.

15. The method of claim 14 wherein altering the surface tension includes raising the surface tension to about 40 dynes/cm or more.

* * * * *